(12) United States Patent
Aizawa et al.

(10) Patent No.: US 6,496,657 B2
(45) Date of Patent: *Dec. 17, 2002

(54) CAMERA

(75) Inventors: Takeshi Aizawa, Tokyo (JP); Tsuyoshi Kakita, Tokyo (JP)

(73) Assignee: Konica Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/503,848

(22) Filed: Feb. 15, 2000

(65) Prior Publication Data

US 2002/0081114 A1 Jun. 27, 2002

(30) Foreign Application Priority Data

Feb. 16, 1999 (JP) .......................................... 11-037588

(51) Int. Cl.$^7$ ........................ G03B 13/02; G03B 13/10; G03B 13/00; G03B 17/00
(52) U.S. Cl. ........................ 396/376; 396/77; 396/103; 396/379
(58) Field of Search .................. 396/77, 103, 158, 396/373, 376, 379, 380, 56, 59, 148; 348/211, 333.01, 333.06

(56) References Cited

U.S. PATENT DOCUMENTS

| | | | | |
|---|---|---|---|---|
| 4,560,261 A | * | 12/1985 | Ueda et al. ................... | 396/336 |
| 4,757,388 A | * | 7/1988 | Someya et al. .............. | 348/211 |
| 5,537,175 A | * | 7/1996 | Kamaya et al. .............. | 396/376 |

* cited by examiner

*Primary Examiner*—David M. Gray
*Assistant Examiner*—Rochelle Blackman
(74) *Attorney, Agent, or Firm*—Finnegan, Henderson, Farabow, Garrett & Dunner, L.L.P.

(57) ABSTRACT

A camera includes: a distance measuring device for measuring an object distance; a photometry device for measuring an object brightness; a mode setting device for setting a self portrait photographic mode to set a photographic condition appropriate for photographing a photographer oneself holding the camera; and a controller for controlling to perform photographing without conducting at least one of the measurement by the distance measuring device and the measurement by the photometry device when the self portrait photographic mode is set by the mode setting device.

12 Claims, 11 Drawing Sheets

CAMERA

BACKGROUND OF THE INVENTION

The present invention relates to a camera, and particularly to a camera which can enable the photographer to be an object of the photograph while the photographer holds the camera.

In ordinary picture taking by using the camera, the photographer looks into a viewfinder of the camera and selects a desired object, and releases a shutter at an optimum shutter chance. The camera has the structure appropriate for such a picture taking, and more concretely, a viewfinder is provided at a position into which the photographer holding the camera can look, and a release button is provided at a position on which an index finger of the right hand holding the camera is just located. Accordingly, it can be said that the camera is not structured in itself such that it may photograph the photographer while the photographer holds the camera.

In contrast to this, there is a case in which the photographer desires to be an object of the photograph. In such a case, the photographer sets the camera onto the tripod, and photographs oneself by using a self-timer mechanism or a remote operation type release mechanism, or by requesting the photographing by another person, and any of the photographing modes are appropriately selected corresponding to the conditions.

However, because the tripod is weighty and bulky as compared with the camera, it is inconvenient for the photographer to always carry the tripod, and when the photographer desires to photograph oneself, it is not always possible to use the tripod. Further, in the photographing using the self-timer mechanism, there is a problem that it is difficult to perform photographing by taking the optimum shutter chance. Further, there is a case where only the photographer is present in the place at which photographing is desired, and in such case, it is impossible to ask another person to photograph the photographer.

On the other hand, it is possible for the photographer to photograph the oneself by holding the camera of the conventional technology by one hand and opposing the camera to oneself by fully extending the arm of that hand. However, in such photographing, because the photographer is the object of the photograph and is in the front of the camera, the photographer can not look into the viewfinder. Accordingly, for example, the photographer can not confirm whether the infrared ray for ranging of the infrared ray ranging device radiates on oneself. When the infrared ray for ranging does not radiate on the photographer, there is a possibility that an object distance is erroneously measured, thereby resulting in a possibility that the image may be out-of-focus when the photograph is taken. Further, when the camera is held by only the single hand, there is a problem that the camera may shake easily.

Accordingly, there is also an idea that, for example, photographic conditions such as a focus position or stop value of a photographic lens are fixed in the camera. However, because such a camera becomes an exclusive camera to photograph the photographer while holding the camera, it can not be used for the other photographing, which is inconvenient. Accordingly, it is preferable that the photographic conditions can be changed in the camera so that the ordinary photographing can also be conducted.

SUMMARY OF THE INVENTION

In view of the foregoing problems of the conventional technology, an object of the present invention is to provide a camera by which a photographic mode appropriate for a case to photograph a photographer oneself can be set at an appropriate timing, or a camera by which such the operability of the camera is increased.

The above described object can be attained by any one of the following structures (1)–(42).

(1) A camera comprising: a distance measuring means for measuring an object distance; a photometry means for measuring an object brightness; a mode setting means for setting a self portrait photographic mode to set a photographic condition appropriate for photographing a photographer oneself holding the camera; and a controller for controlling to perform photographing without conducting at least one of the measurement by the distance measuring means and the measurement by the photometry means when the self portrait photographic mode is set by the mode setting means.

(2) A camera comprising: a zoom lens; a mode setting means for setting a self portrait photographic mode to set a photographic condition appropriate for photographing a photographer oneself holding the camera; and a controller for controlling the zoom lens so that the zoom lens moves to a predetermined position, as the photographic condition, when the self portrait photographic mode is set by the mode setting means.

(3) The camera of the structure (2), in which, when the self portrait photographic mode is set, movement of the zoom lens except that the zoom lens moves to the predetermined position, is prohibited.

(4) The camera of the structure (2), in which the predetermined position is located on a wide angle side of the zoom lens.

(5) The camera of the structure (4), in which the predetermined position is located on a wide angle end of a photographic lens of the camera.

(6) A focal length adjustable camera comprising: a photographic lens; a mode setting means for setting a self portrait photographic mode to set a photographic condition appropriate for photographing a photographer oneself holding the camera; and a controller for controlling the photographic lens so that the photographic lens is fixed to a predetermined focal length, when the self portrait photographic mode is set by the mode setting means.

(7) The camera of the structure (6), in which the predetermined position is a position at which a focal length of the photographic lens is located on a wide angle side.

(8) The camera of the structure (6), in which the predetermined position is located on a wide angle end of the photographic lens.

(9) A camera comprising: a photographic lens; a distance measuring means for measuring an object distance; a mode setting means for setting a self portrait photographic mode to set a photographic condition appropriate for photographing a photographer oneself holding the camera; and when the self portrait photographic mode is set by the mode setting means, a predetermined photographic condition is set without depending on the measurement result of the distance measuring means.

(10) A camera comprising: a photographic lens; a mode setting means for setting a self portrait photographic mode to set a photographic condition appropriate for photographing a photographer oneself holding the camera; and when the self portrait photographic mode is set by the mode setting means, a predetermined photographic condition is set without depending on the measurement result of the photometry means.

(11) The camera of the structure (9), further comprising: a photometry means for measuring an object brightness; and when the self portrait photographic mode is set by the mode setting means, a predetermined photographic condition is set without depending on the measurement result of the photometry means or the distance measuring means.

(12) The camera of the structure (9), in which, as the predetermined photographic condition, a focus position of the photographic lens is set to a predetermined position without depending on the measurement result of the distance measuring means.

(13) The camera of the structure (12), in which the predetermined position is a position at which an object of the object distance of 0.5 to 0.6 m is focused.

(14) The camera of the structure (2), in which, as the photographic condition, light emission of a red-eye reduction light emitter is inhibited.

(15) The camera of the structure (6), in which, as the photographic condition, light emission of a red-eye reduction light emitter is inhibited.

(16) The camera of the structure (9), in which, as the photographic condition, light emission of a red-eye reduction light emitter is inhibited.

(17) The camera of the structure (10), in which, as the photographic condition, light emission of a red-eye reduction light emitter is inhibited.

(18) The camera of the structure (1), wherein the camera can change the size of a picture-taking image frame, and as the predetermined photographic condition, a predetermined picture-taking image frame is set.

(19) The camera of the structure (2), wherein the camera can change the size of a picture-taking image frame, and as the predetermined photographic condition, a predetermined picture-taking image frame is set.

(20) The camera of the structure (6), wherein the camera can change the size of a picture-taking image frame, and as the predetermined photographic condition, a predetermined picture-taking image frame is set.

(21) The camera of the structure (9), wherein the camera can change the size of a picture-taking image frame, and as the predetermined photographic condition, a predetermined picture-taking image frame is set.

(22) The camera of the structure (10), wherein the camera can change a size of a picture-taking image frame, and as the predetermined photographic condition, a predetermined picture-taking image frame is set.

(23) The camera of the structure (18), in which the predetermined picture-taking image frame is a size except a panorama size.

(24) The camera of the structure (19), in which the predetermined picture-taking image frame is a size except a panorama size.

(25) The camera of the structure (20), in which the predetermined picture-taking image frame is a size except a panorama size.

(26) The camera of the structure (21), in which the predetermined picture-taking image frame is a size except a panorama size.

(27) The camera of the structure (22), in which the predetermined picture-taking image frame is a size except a panorama size.

(28) The camera of the structure (23), in which the predetermined picture-taking image frame is of a full-size.

(29) The camera of the structure (24), in which the predetermined picture-taking image frame is of a full-size.

(30) The camera of the structure (25), in which the predetermined picture-taking image frame is of a full-size.

(31) The camera of the structure (26), in which the predetermined picture-taking image frame is of a full-size.

(32) The camera of the structure (27), in which the predetermined picture-taking image frame is of a full-size.

(33) The camera of the structure (1), wherein the set self portrait photographic mode is released corresponding to a predetermined operation.

(34) The camera of the structure (2), wherein the set self portrait photographic mode is released corresponding to a predetermined operation.

(35) The camera of the structure (6), wherein the set self portrait photographic mode is released corresponding to a predetermined operation.

(36) The camera of the structure (9), wherein the set self portrait photographic mode is released corresponding to a predetermined operation.

(37) The camera of the structure (10), wherein the set self portrait photographic mode is released corresponding to a predetermined operation.

(38) The camera of the structure (33), in which the predetermined operation is at least one of a shutter releasing, turning-off operation of a power switch of the camera, and turning-on operation of a film rewind switch.

(39) The camera of the structure (34), in which the predetermined operation is at least one of a shutter releasing, turning-off operation of a power switch of the camera, and turning-on operation of a film rewind switch.

(40) The camera of the structure (35), in which the predetermined operation is at least one of a shutter releasing, turning-off operation of a power switch of the camera, and turning-on operation of a film rewind switch.

(41) The camera of the structure (36), in which the predetermined operation is at least one of a shutter releasing, turning-off operation of a power switch of the camera, and turning-on operation of a film rewind switch.

(42) The camera of the structure (37), in which the predetermined operation is at least one of a shutter releasing, turning-off operation of a power switch of the camera, and turning-on operation of a film rewind switch.

Further, preferred structures will be described below.

(1) A camera, which can set a self portrait photographic mode to set a photographic condition appropriate for photographing a photographer oneself holding the camera, and which is characterized in that, when the self portrait photographic mode is set, photographing is performed without conducting at least either the distance measuring or the photometry.

(2) A camera, which has a zoom lens and can set a self portrait photographic mode to set a photographic condition appropriate for photographing a photographer oneself holding the camera, and which is characterized in that, when the self portrait photographic mode is set, as a predetermined photographic condition, the zoom lens is moved to a predetermined position.

(3) The camera described in the structure (2), which is characterized in that, when the self portrait photographic mode is set, movement of the zoom lens except that the zoom lens is moved to a predetermined position, is inhibited.

(4) The camera described in the structure (2) or (3), wherein the predetermined position is located on a wide angle side of the zoom lens.

(5) A camera, which has a self portrait photographic mode to set a photographic condition appropriate for photographing a photographer oneself holding the camera, and can change a focal length, and which is characterized in that, when the self portrait photographic mode is set, the photographic lens is fixed at a predetermined focal length.

(6) The camera described in the structure (5), wherein the predetermined focal length is a position at which the focal length of the photographic lens is located on a wide angle side.

(7) The camera described in the structure (6), wherein the predetermined focal length is located on the wide angle end of the photographic lens.

(8) A camera, which can set a self portrait photographic mode to set a photographic condition appropriate for photographing a photographer oneself holding the camera, and which is characterized in that, when the self portrait photographic mode is set, a predetermined photographic condition is set regardless of the result of the distance measuring or the photometry.

(9) The camera described in the structure (8), wherein, as a predetermined photographic condition, the focus position of the photographic lens is set at a predetermined position regardless of the result of the distance measuring.

(10) The camera described in the structure (9), wherein the predetermined position is a position to focus the object of the object distance of 0.5 to 0.6 m.

(11) The camera described in any one of the structures (2) through (10), wherein, as a photographic condition, light emission of a red-eye reduction light emitter is inhibited.

(12) The camera described in the structure (11), wherein the red-eye reduction light emitter is a red-eye reduction lamp or a flash lamp.

(13) The camera described in any one of the structures (2) through (12), wherein a signal from a remote operation type release device can be inputted into the camera, and as the predetermined photographic condition, a shutter can be released corresponding to a signal from the release device.

(14) The camera described in any one of the structures (2) through (13), wherein the camera can change a size of a picture-taking image frame, and as the predetermined photographic condition, a predetermined picture-taking image frame is set.

(15) The camera described in the structure (14), wherein the predetermined picture-taking image frame is a size except a panorama size.

(16) The camera described in the structures (14) or (15), wherein the predetermined picture-taking image frame is a full-size, wherein the full-size is the maximum picture-taking image frame which can be photographed by the camera, and wherein, in IX 240 camera, a Hi-Vision size is set as the predetermined picture-taking image frame.

(17) The camera described in any one of the structures (1) through (16), wherein the set self portrait photographic mode is released corresponding to a predetermined operation.

(18) The camera described in the structure (17), wherein the predetermined operation is a shutter releasing.

(19) The camera described in the structure (17), wherein the predetermined operation is a turning-off operation of a power switch.

(20) The camera described in the structure (17), wherein the predetermined operation is a turning-on operation of a film rewinding switch.

(21) A camera, which can set a self portrait photographic mode to set a photographic condition appropriate for photographing a photographer oneself holding the camera, and which comprising: a mirror member by which the photographer holding the camera can visually confirm the reflected image of the photographer oneself; a displacement member to displace the mirror member between the visibly confirming condition in which the image can be visually confirmed, and the invisibly confirming condition in which the image can not be visually confirmed; and a driving means for driving the displacement member so that the mirror member is displaced to the visibly confirming condition, as the self portrait photographic mode is set.

(22) A camera, which can set a self portrait photographic mode to set a photographic condition appropriate for photographing a photographer oneself holding the camera, and which having: a mirror member by which the photographer holding the camera can visually confirm the reflected image of the photographer oneself; and a displacement member to displace the mirror member between the visibly confirming condition in which the image can be visually confirmed, and the invisibly confirming condition in which the image can not be visually confirmed, wherein the self portrait photographic mode is set as the mirror member is displaced to the visibly confirming condition.

(23) The camera described in the structure (21) or (22), wherein the self portrait photographic mode is released as the mirror member is displaced from the visibly confirming condition to the invisibly confirming condition.

(24) The camera described in the structure (21) or (22), wherein, when the self portrait photographic mode is released, displaced from the visibly confirming condition to the invisibly confirming condition.

(25) The camera described in any one of the structures (21) through (24), wherein the camera can change the picture-taking image frame, and a display means for displaying the information of the picture-taking image frame is provided on the mirror member or the displacement member.

(26) A camera, which having a mirror member which can be moved between the reflection position at which the photographer holding the camera can visually confirm the reflected image of the photographer oneself, and the non-reflection position which differs from the reflection position, and is characterized in that the power switch of the camera is turned on as the mirror member is moved to the reflection position.

(27) A camera, which can set a self portrait photographic mode to set a photographic condition appropriate for photographing a photographer oneself holding the camera, and a mirror member can be attached to a reflection position at which a photographer holding the camera can visually confirm an image of the reflected photographer oneself, and is characterized in that the self portrait photographic mode is set as the mirror member is attached to the camera.

(28) The camera described in the structure (27), wherein the set self portrait photographic mode is released as the mirror member is detached from the camera.

(29) The camera described in any one of the structures (1) through (28), wherein the camera has an notifying means for notifying that the self portrait photographic mode is set, to the photographer.

(30) The camera described in the structure (29), wherein the notifying means is provided on the front surface of the camera, and is a light emitting means for being turned-on according to the setting of the self portrait photographic mode.

(31) The camera described in the structures (30), wherein the light emitting means is a lamp.

(32) The camera described in the structure (30) or (31), wherein the light emitting means is used in common to the red-eye reduction lamp.

(33) The camera described in the structure (30) or (31), wherein the light emitting means is used in common to the self timer lamp.

DETAILED DESCRIPTION OF THE PREFERRED EMBODIMENT

Figure 1:
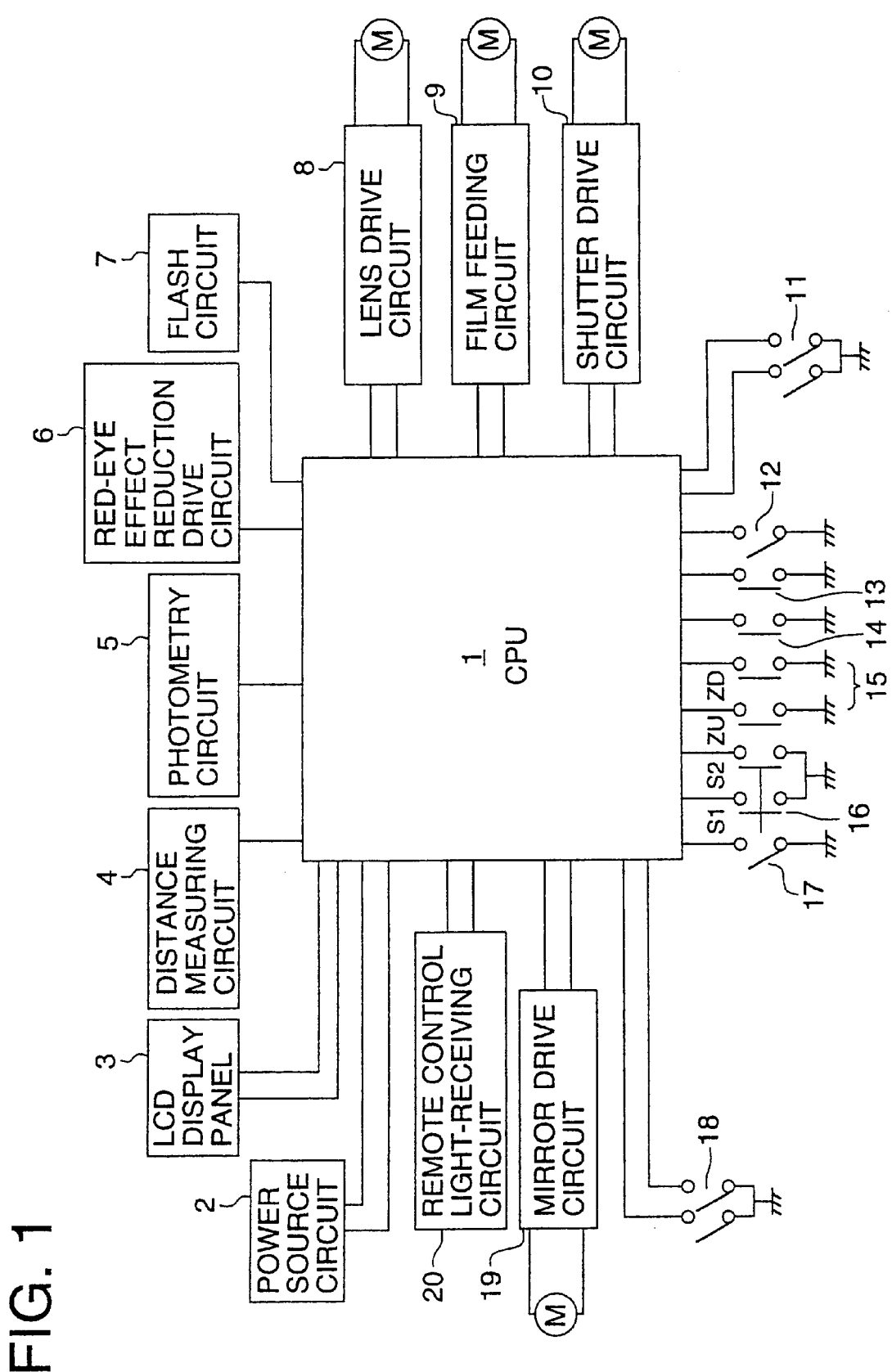
FIG. 1 is a block diagram of a camera according to the present embodiment.

Referring to the drawings, an embodiment of the present invention will be described below, however, "self portrait photographic mode" used in the present specification implies a photographic mode appropriate for photographing a photographer oneself holding a camera, without using a tripod.

FIG. 1 is a block diagram of a camera according to the present embodiment. In FIG. 1, a CPU 1 of a camera is connected to a power source circuit 2, LCD display panel 3, distance measuring circuit 4, photometry circuit 5, red-eye relief driving circuit 6, flash circuit 7, lens driving circuit 8, film feeding circuit 9, shutter driving circuit 10, picture-taking image frame changing switch 11, mirror detection switch 12, rewind switch 13, mode switch 14, zoom operation switch 15, release switch 16, main switch 17, mirror driving switch 18, mirror driving circuit 19, and remote control light receiving circuit 20. Based on turning-on operation of the main switch 17, the CPU 1 can start the following control for photographing.

In the case where the photographing in the normal photographing mode is desired, the CPU 1 sets the normal photographing mode when the photographer operates the mode switch 14 to the "normal photographing mode" side. However, in the present embodiment, actually, the camera is structured so as to automatically set the "normal photographing mode" by the turning-on operation of the main switch 17. When the photographer operates the zoom operation switch 15, the photographic lens (not shown) with the zoom function is made to zoom-up or zoom-down, and the magnitude of the image photographed on the film can be arbitrarily determined.

Then, corresponding to a signal of the release switch 16 according to half-pressing of a shutter release button (not shown), the CPU 1 measures the brightness of an object by the photometry circuit 5, and drives the distance measuring circuit 4 and measures the distance to the object, and according to the measured distance to the object, controls the lens driving circuit 8 so as to drive the photographic lens (not shown) to the focus position. Incidentally, in the present embodiment, the focusing driving and the zooming of the photographic lens are conducted by the driving power of the same motor.

Further, corresponding to a signal of the release switch 16 according to full-depressing of the shutter release button, the CPU 1 controls the shutter driving circuit 10 so that the shutter (not shown), serving as the aperture, is driven by the shutter speed and the aperture value determined according to the result of the photometry from the photometry circuit 5. After photographing, the CPU 1 drives the film (not shown) through the film feeding circuit 9, and conducts the wind-up operation by one frame. When the whole film frames which can be exposed, are exposed, or the rewind switch 12 is operated, the film is wound up by the film feeding circuit 9. Incidentally, the CPU 1 can also release the shutter when a signal from a remote device (not shown) is inputted through a remote control light receiving circuit 20.

Further, when the brightness of field is judged to be low according to the result of photometry of the photometry circuit 5, the CPU 1 drives the flash circuit 7 for emitting the flash light. In such the case, in the control which is so-called flash-matic, instead of that the light emission amount of the flash is made always maximum, by adjusting the aperture value at the time of flash light emission, the exposure amount onto the film surface is adjusted.

On the one hand, in the case where the photographing is desired to be conducted in the self portrait mode, when the mode switch 14 is switched to the "self portrait mode" side by the photographer, the CPU 1 sets the self portrait mode.

Because the object to be photographed in the self portrait mode is the photographer oneself holding the camera, the object distance can be made a short distance, thereby, even when the photographer is shifted from the distance measuring position on the image screen, it can be made to focus on the photographer. Further, in order to make the depth of field deep, it is preferable to set the aperture value onto the small aperture side. Further, in order to meet that camera-shake easily occurs by holding the camera by the single hand, it is preferable that the shutter speed is made higher. Incidentally, in order to make up for the exposure amount which is lowered by increasing the shutter speed, it is preferable that the flash light is emitted without depending on the brightness of field.

According to the above description, in the present embodiment, as the mode switch is switched to the self portrait mode side, the CPU 1 forcibly sets the following photographing conditions.

(1) The CPU 1 drives the lens driving circuit 8, and sets the zoom position to the wide angle end side, and makes the picture-taking image frame coincide with the reflection range of the visual confirming mirror, which will be described later. Incidentally, in order to photograph the range for which the photographer desires to actually photograph, without fail, it is preferable that the size of the picture-taking image frame is a slightly larger size than the reflection range of the visual confirming mirror.

(2) The CPU 1 drives the lens driving circuit 8 and sets the focus position of the photographic lens to the position at which the camera can focus on the object which is at the object distance of 0.4 to 1.0 m, preferably, 0.5 to 0.6 m (in the present embodiment, 0.55 m), and prevents the object from being out of focus according to the miss distance measuring caused by the deviation of the distance measurement light.

(3) The CPU 1 drives the shutter driving circuit 10 and forcibly sets the aperture to the small aperture side, and increases the depth of field. More concretely, corresponding to the sensitivity of the film loaded in the camera, when the ISO sensitivity of the film is not less than 400, the CPU 1 sets the aperture value to F22, and when the ISO sensitivity of the film is not more than 400, the CPU 1 sets the aperture value to F16.

(4) The CPU 1 drives the flash circuit 7 and conducts the flash light emission (so-called the daylight synchronized flash) corresponding to the shutter releasing, and makes up for the exposure amount which is lowered corresponding to the small aperture setting.

On the one hand, as the photographic conditions other than that, it is considered, for example, to inhibit the red-eye reduction operation such as the operation by the red-eye reduction lamp or the pre-light emission of the flash, and conduct the shutter release at the appropriate timing. This is from the reason that the red-eye phenomena hardly occurs because the object distance is a short distance. Further, because when the release button is pressed while the camera is being held by one hand, camera-shake easily occurs, it is also considered that the remote type release signal using the infrared ray is made to be received, thereby, the camera-shake is prevented to the utmost.

In addition to that, the situation that the photographer always photographs the photographer oneself is hardly considered, and when the mode is switched to the self portrait mode, because the photographic condition different from the time of ordinary photographing is set, it is preferable that the self portrait mode is released under a predetermined condition independent of the operation of the photographer, and the photographing which is not intended by the photographer, due to the forgetfulness of mode release is prevented. As the predetermined condition, it is considered that the self portrait mode is released for each photographing. On the one hand, although there is also a case in which it is desired that the photographer oneself is continuously photographed, in such the case, in order to avoid the troublesomeness to set the mode setting for each time of photographing, it is considered that the self portrait mode is released by the turning-off operation of the main switch. Further, when the photographer conducts zooming at the time of the self portrait mode setting, the photographer is regarded s if he has no more intention to photograph in the self portrait mode, and therefore, it is also considered that the self portrait mode is released. Further, when the photographer turns on the rewind switch at the time of the self portrait mode setting, because the possibility that the photographer continuously photographs in the self portrait mode, is low, it is also considered that the self portrait mode is released in the same manner as the above description.

Figure 2:
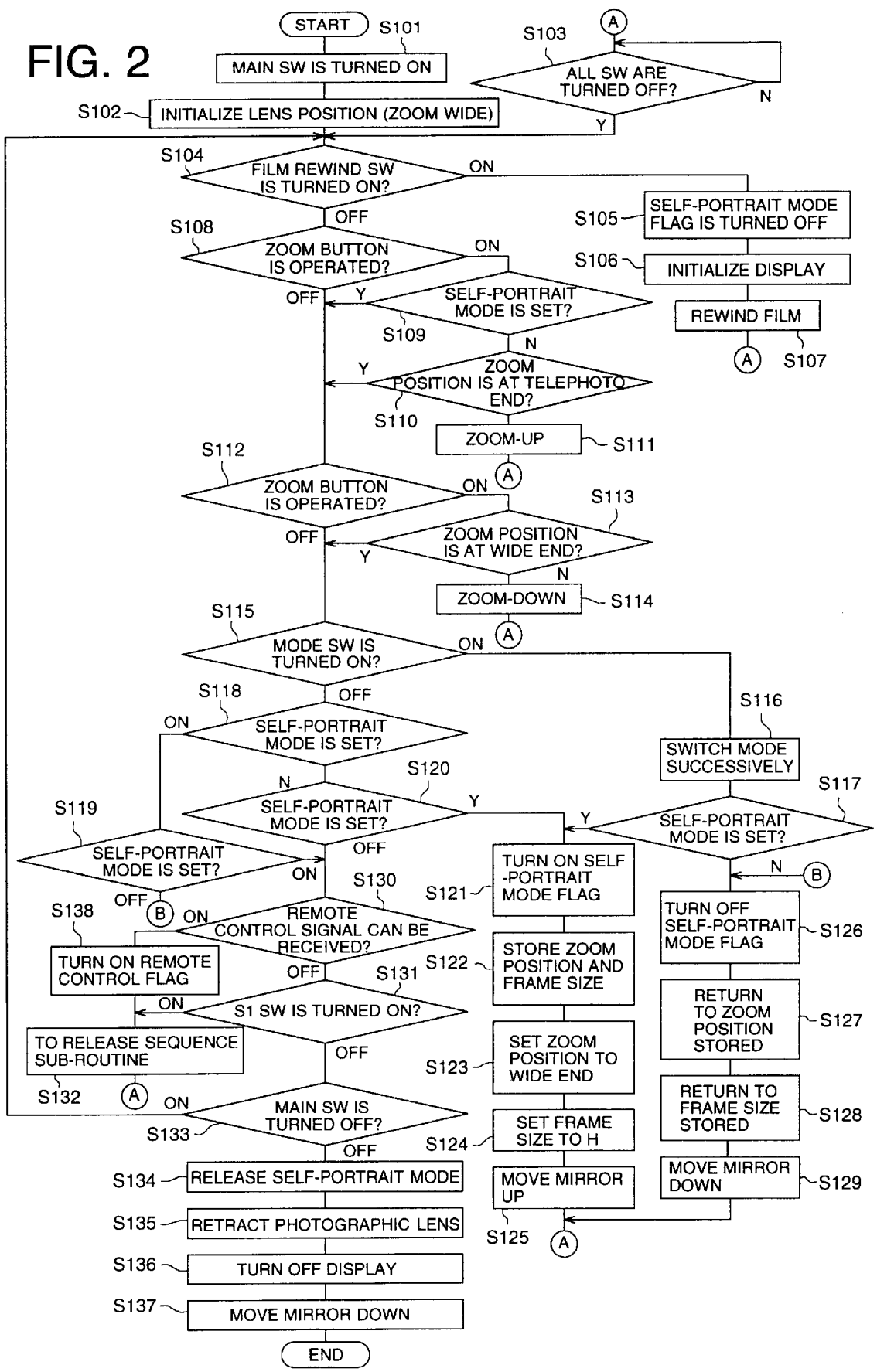
FIG. 2 is a flow chart showing operations of the camera according to the present embodiment.
Figure 3:
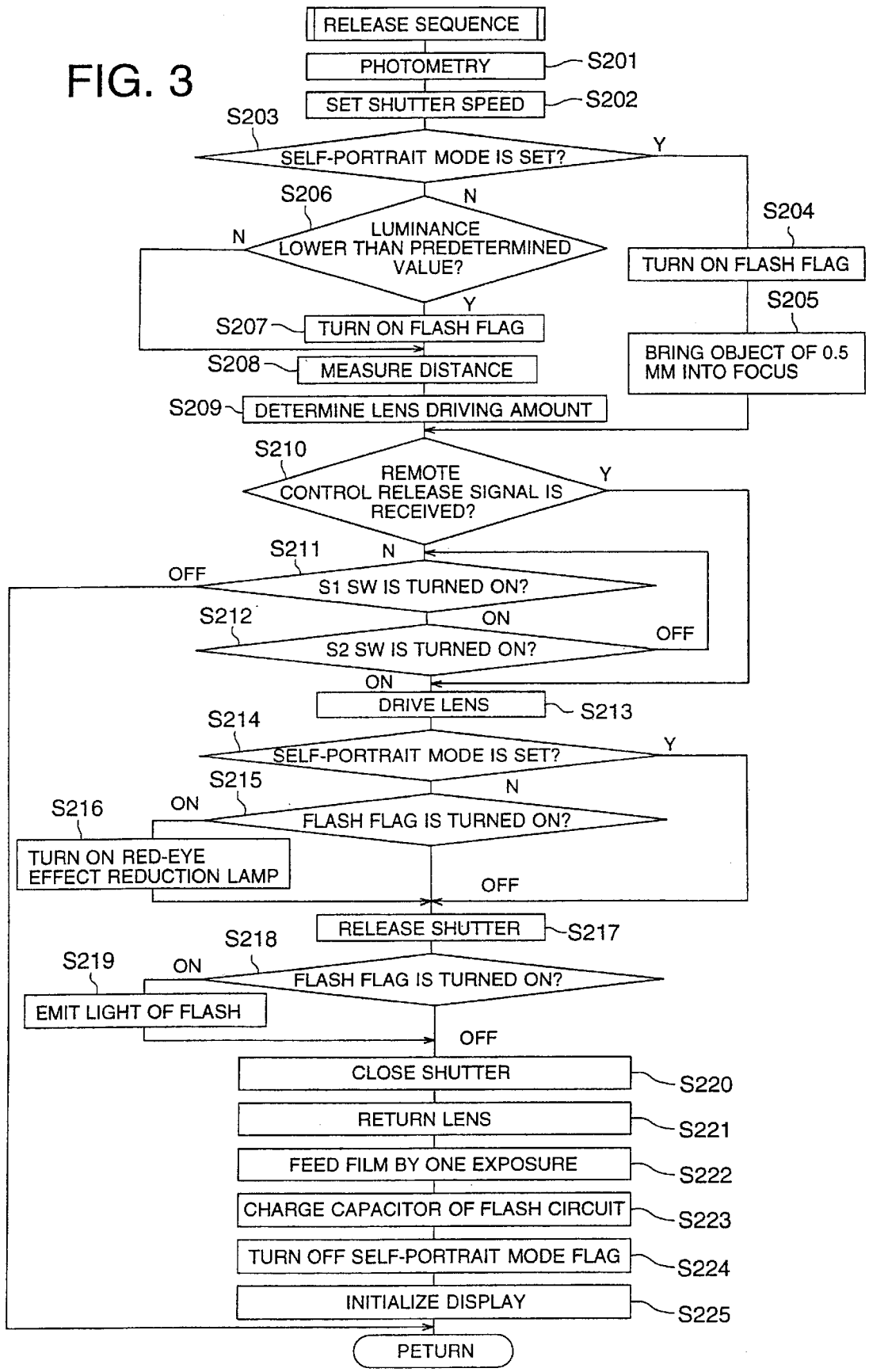
FIG. 3 is a flow chart showing operations of the camera according to the present embodiment.

Next, referring to the flow chart, concrete operations of the present embodiment will be described. FIGS. 2 and 3 are flow charts showing operations of a camera according to the present embodiment.

In step S102, the CPU 1 drives the lens driving circuit 8 and moves the photographic lens to the initial position, that is, the wide angle end position, corresponding to the turning-on operation of the main switch 17 which is conducted in step S101 in FIG. 2. In the following step S104, the CPU 1 judges whether the rewind switch 13 is turned on, and when it is judged that the switch 13 is turned on, a self portrait mode flag is turned off in step 105.

Further, in step S106, the CPU 1 initializes of the display in the LCD display 3 (that is, reset of the number of exposed frames), and in step S107, drives the film feeding circuit 9 and rewinds the film. After that, the flow advances to step S103, and herein, the CPU 1 waits until all of switches are operated for turning off, and returns again the flow to step S104.

In step S104, when the CPU 1 judges that the rewind switch 13 is not operated for turning on, in the next step S108, the CPU 1 judges whether the zoom button 15 is operated so that zoom up is conducted. When the CPU 1 judges that the zoom button 15 is operated, in step S109, the CPU 1 judges according to the flag whether the self portrait mode is set, and when the CPU 1 judges that it is set, in order to inhibit the zooming operation, the flow is advanced to step S112.

In step S109, when the CPU 1 judges according to the flag that the self portrait mode is not set, the CPU 1 drives the lens driving circuit 8 so far as the zoom position is not the telephoto end side (step S110), and conducts the zoom-up operation (step S111), and returns the flow to step S103. When the zoom position is the telephoto end, the flow advances to step S112.

Further, in step S112, the CPU 1 judges whether the zoom button 15 is operated so that zoom down is conducted. When the CPU 1 judges that the zoom button is operated, the CPU 1 drives the lens driving circuit 8 so far as the zoom position is not the wide angle end (step S110), and conducts zoom-down operation (step S114), and returns the flow to step S103. When the zoom position is the wide angle end, the flow advances to step S115.

In step S115, the CPU 1 judges whether the mode switch 14 is operated for turning on. When the CPU 1 judges that the mode switch 14 is operated for turning on, the CPU 1 successively switches the mode in step S116. Further, step S117, the CPU 1 judges whether the self portrait mode is set. When the CPU 1 judges that the self portrait mode is set, the CPU 1 turns on the self portrait mode flag, and stores the zoom position and the image plane size in step S122. Herein, the CPU 1 stores the zoom position and the image plane size, for the reason that, when the mode is further switched, the mode can be returned soon to the previous setting.

Hereinafter, as described above, the CPU 1 sets the photographic conditions corresponding to the self portrait mode. That is, in step S123, the CPU 1 drives the lens driving circuit 8, and sets the zoom position to the wide angle end side. Further, in step S124, the CPU 1 sets the picture-taking image frame to H (Hi-Vision size). Incidentally, although the detail will be described later, when the mirror is provided in such a manner that it can tilt up and tilt down, in step S125, the CPU 1 conducts the mirror-up operation. After that, the flow returns to step S103.

On the one hand, in step S117, when the CPU 1 judges that the self portrait mode is not set, in step S126, the CPU 1 turns off the self portrait mode flag, and further, re-sets the stored zoom position and the image plane size (steps S127, S128). Further, when the above-described mirror is provided in the camera, the CPU 1 conducts the mirror-down operation in step S129. After that, the flow returns to step S103.

In step S115, when the CPU 1 judges that the mode switches 14 is not turned on, the CPU 1 judges whether the self portrait mode is set, in step S118. When the self portrait mode is set, the CPU 1 judges whether the mirror driving switch 18 is turned on, in step S119. When the mirror driving switch 18 is not turned on, the flow advances to the above-described step S126. On the one hand, when the mirror driving switch 18 is turned on, the flow advances to step S130, which will be described later.

On the one hand, in step S118, when the CPU 1 judges that the self portrait mode is not set, the CPU 1 judges whether the mirror driving switch 18 is turned on, in the next step S120. When the mirror driving switch 18 is turned on, the flow advances to the above-described step S121. On the one hand, when the mirror driving switch 18 is not turned on, the CPU 1 can receive the remote control release signal from the outside through the remote control light receiving circuit 20, in the next step S130.

In step S130, when the CPU 1 receives the remote control release signal, after the CPU 1 turns on the remote control flag in step S138, the flow advances to a release sequence subroutine (step S132). When the CPU 1 does not receive the remote control release signal in step S130, and the release switch 16 is in the half-depressed condition (that is, S1 is on), the flow also advances to the release sequence subroutine (step S132). The release sequence subroutine will be described later referring to FIG. 3.

When the CPU 1 does not receive the remote control release signal, and the release switch 16 is not in the half-pressing condition, the CPU 1 judges whether the main switch 17 is turned off, in step S133. When the main switch 17 is in the on-condition, the flow returns again to step S104. On the one hand, when the CPU 1 judges that the main switch 17 is in the off-condition, in step S134, when, for example, the self portrait mode is set, the CPU 1 releases it, and in step S135, for easy housing, drives the lens driving circuit 8 and collapses the photographic lens.

Further, in step S136, the CPU 1 shuts off the power supply to the LCD display panel 3, and makes it a non-displayed condition, and when the mirror is in the up-condition, the CPU 1 makes the mirror down in step S137. In such the condition, the CPU waits that the main switch 17 is turned on again.

Next, the release sequence will be described. In step S201, corresponding to the half-pressing (S1) of the release switch 16, the CPU 1 makes the photometry circuit 5 operate the photometry operation, and according to that, in step S202, sets the shutter speed.

In step S203, the CPU 1 judges whether the self portrait mode is set. When the self portrait mode is set, the CPU 1 turns on the flash flag in step S204, and in step S205, controls the lens driving circuit 8 so that the object whose object distance is 0.55 m, is focused, and the photographic lens is driven for focusing. After that, the flow advances to the step S210 without conducting the distance measurement.

On the one hand, in step S203, when the CPU 1 judges that the self portrait mode is not set, in step S206, the CPU 1 judges the brightness of field, and turns on the flash flag in step S207 only when the brightness of field is lower than a predetermined brightness.

Further, in step S208, the CPU 1 makes the distance measuring circuit 4 conduct the distance measurement, and according to that, in step S209, the lens driving amount is determined. In S210, the CPU 1 judges that the remote control release signal is received from the outside through the remote control light receiving circuit 20.

In step S210, when the remote control release signal is received, the flow advances to step S213. On the one hand, when the remote control release signal is not received, in step 211, the CPU 1 judges whether the release switch 16 is half-depressed. When the release switch 16 is neither half-depressed nor full-depressed, the flow leaves the release sequence routine.

Further, in step S212, the CPU 1 waits that the release switch 16 is full-depressed (S2 on), and corresponding to full-depressing of the release switch 16, in the next step S213, drives the lens according to the lens driving amount set in step S205 or step S209.

Next, in step S214, the CPU 1 judges whether the self portrait mode is set. When the self portrait mode is set, the flow advances to step S217. On the one hand, in the case where the CPU 1 judges that the self portrait mode is not set, in step S215, when the CPU 1 judges the flash flag is on, the CPU 1 drives the red-eye reduction driving circuit 6 and turns on the red-eye lamp (red-eye reduction lamp) (step S216), and when the CPU 1 judges that the flash flag is off, in step S127, the CPU 1 drives the shutter driving circuit 10 and releases the shutter, without turning on the red-eye lamp.

Further, in step S218, when the CPU 1 judges th at the flash flag is on, the CPU 1 drives the flash circuit 7 and makes it emit the flash light (step S219), and when the CPU judges that the flash flag is off, in step S220, the CPU 1 drives the shutter driving circuit 10 and closes the shutter without emitting the flash light.

In step S221, the CPU 1 drives the lens driving circuit 8 and the photographic lens is returned, and in step S222, the CPU 1 drives the film feeding circuit 9 and winds up the film by 1 frame. Further, in step S223, the CPU 1 prepares for the next flash photographing, and makes a capacitor in the flash circuit 7 to be charged. Incidentally, when the self portrait mode is released at every completion of one frame exposure, in step S224, the CPU 1 releases the self portrait mode flag. Further, in step 225, the CPU 1 initializes the display of the LCD display panel 3. After that, the flow leaves a release sequence subroutine.

Figure 4:
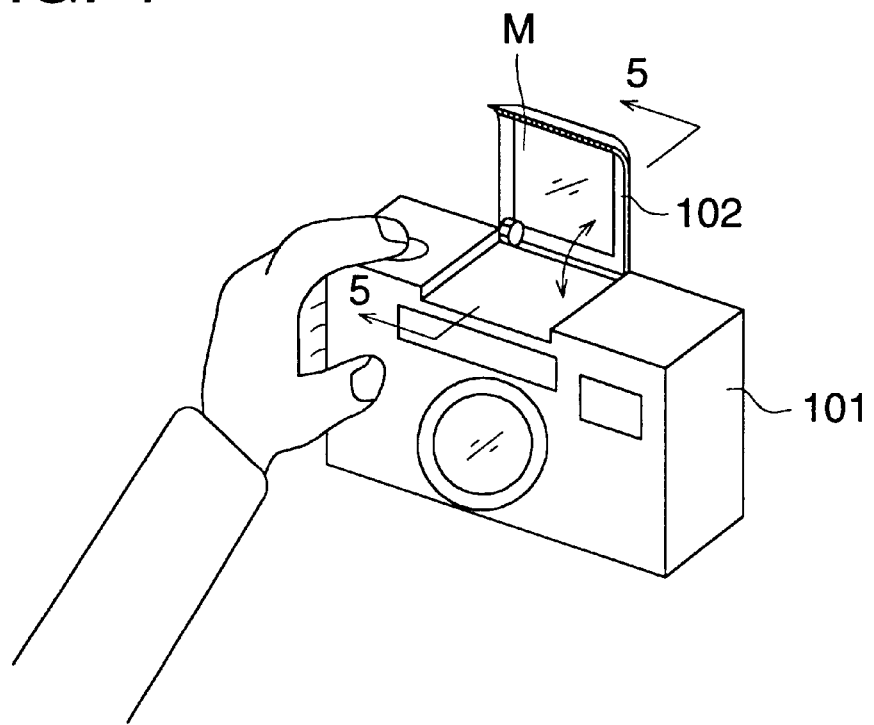
FIG. 4 is a perspective view of the camera shown in the condition that a mirror is raised up to a mirror reflection position.
Figure 5:
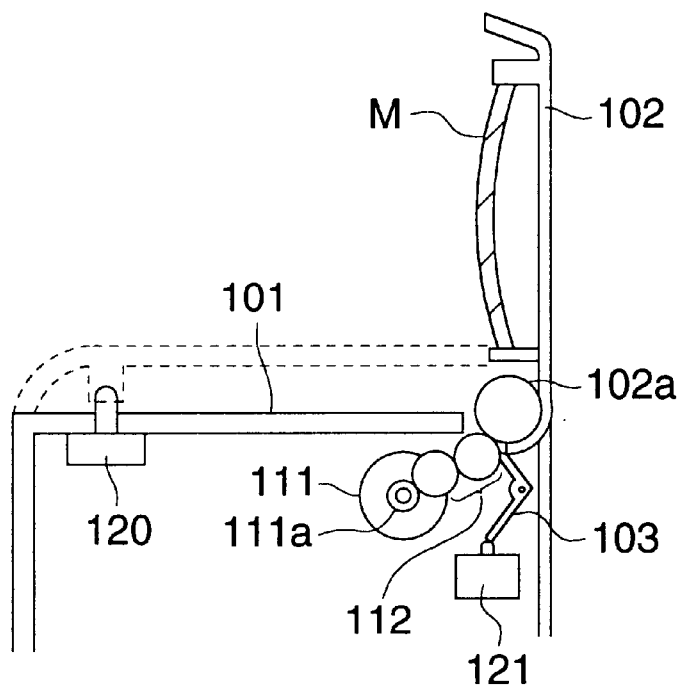
FIG. 5 is a view in which the structure of FIG. 4 is cut on the line 5—5 and viewed in the arrowed direction.

Incidentally, when the photographer oneself is photographed in the self portrait mode, if the photographer can view that the photographer oneself is in the picture-taking image frame, it is convenient. Accordingly, the camera of the present embodiment is provided with a mirror by which the photographer can view oneself. FIG. 4 is a perspective view of the camera showing in a condition that such a mirror is raised up to a reflection position, that is, a condition that the photographer holding the camera can visually confirm the image of the photographer oneself which is reflected by the mirror. FIG. 5 is a view in which the structure of FIG. 4 is cut on the line 5—5 and viewed in the arrowed direction.

In FIG. 4, a mirror cover 102 which is used for serving as a displacement member by which the mirror is displaced to the condition that the photographer can visually confirm the image of the photographer oneself, and to the condition that the photographer can not visually confirm the image of the photographer oneself, is attached onto the upper surface of the camera main body 101 so that it can rotate around the rear end. At the reflection position shown in FIG. 4, a mirror M which is a convex mirror, is attached to the front of the mirror cover 102. The curvature of the mirror is set such that the range of the mirror M coincides with the picture-taking image frame of the camera in which the zoom position is at the wide angle end, when the photographer holding the camera observes it.

In FIG. 5, on the lower end of the mirror cover 102, a fixed gear 102a is formed. The fixed gear 102 is connected to a pinion 111a located on a rotation shaft of a motor 111 as the driving means, through a gear train 112 so that the power can be transmitted. When the rotation shaft of the motor 111 is normally rotated, the fixed gear 102a is rotated and raises up the mirror cover 102, and on the one hand, when the rotation shaft of the motor 111 is reversely rotated, the fixed gear 102a is reversed and brings down the mirror cover 102.

In the camera main body 101, a mirror down switch 120 and a mirror up switch 121 which compose a mirror detection switch 12, are provided. When the mirror cover 102 is brought down at a housing position shown by a dotted line in FIG. 5, which is one of the invisibly confirmation condition that the photographer holding the camera can not visually confirm the image of the reflected photographer oneself by the mirror, a portion of the mirror cover 102 presses the mirror down switch 120, thereby, the mirror-down can be detected. When the mirror cover 102 is raised up to the reflection position shown by a solid line in FIG. 5, the slower end of the mirror cover 102 presses the mirror-up switch 121 through a lever 103, thereby, the mirror-up can be detected. In the present embodiment, the mirror-down switch 120 and the mirror-up switch 121 are both mechanical switches, however, of course, the photoelectric switch such as a photo-reflector may be used. Further, those two switches may be not provided, and this system can be structured such that only one switch is used and the condition of the mirror is detected and controlled.

In the present embodiment, when the self portrait mode is set, the CPU 1 drives the motor 111 and the mirror cover 102 is driven to the reflection position shown in FIGS. 4 and 5. In the reflection position, when the photographer holding the camera photographs oneself, the photographer visually confirms the mirror, and thereby, it can be judged whether the photographer oneself is in the photographing image frame. On the one hand, when the self portrait mode is released, the CPU 1 drives the motor 111, and drives the mirror cover 102 to the housing position closely attached to the upper surface of the camera main body 101. Thereby, at the time of the normal photographing or housing of the camera, the mirror M does not hinder those operations.

Further, before the self portrait mode is set, as the photographer turns on the drive switch (not shown) and then, the mirror-up switch 121 detects that the mirror cover 102 is moved to the reflection position, the self portrait mode can be set. In this case, as the mirror-down switch 120 detects that the mirror cover 102 is moved to the housing position, the self portrait mode can be released.

In addition to that, in the case where the power source of the camera is off, when the photographer turns the mirror cover 102 to the reflection position, as the mirror-up switch 121 detects such the turning, the power source of the camera is turned on, and the self portrait mode can be set. As described above, according to the present embodiment, by the operation to turn the mirror cover 102, the photographer is regarded as he has an intention to photograph in the self portrait mode, the power source of the camera is turned on, and the self portrait mod is set, therefore, a user friendly camera whose operation is simplified, can be provided.

Figure 6:
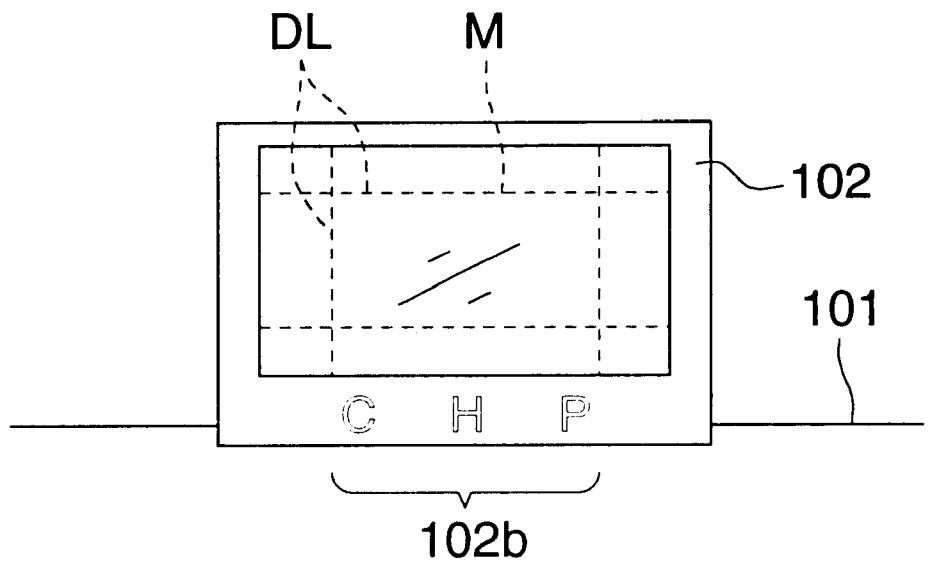
FIG. 6 is a view showing the structure in which a display showing a picture-taking image frame is added to a mirror cover 102, as an example of a modification of the present embodiment.

FIG. 6 is a view showing the structure in which a display showing the picture-taking image frame is added to the mirror cover 102 as an modification of the present embodiment. The film which is respectively cut out into the small letter shape of (C), (H), and (P), is provided on the lower portion of the mirror cover 102, and the LEDs (not shown) are arranged inside it. Such the LEDs are turned on corresponding to the picture-taking image frames (conventional size, Hi-Vision size, and panorama size) set on the camera side. Incidentally, instead of such the display, or together with it, a display line DL showing the picture-taking image frames may be marked on the surface of the mirror M.

Figure 7:
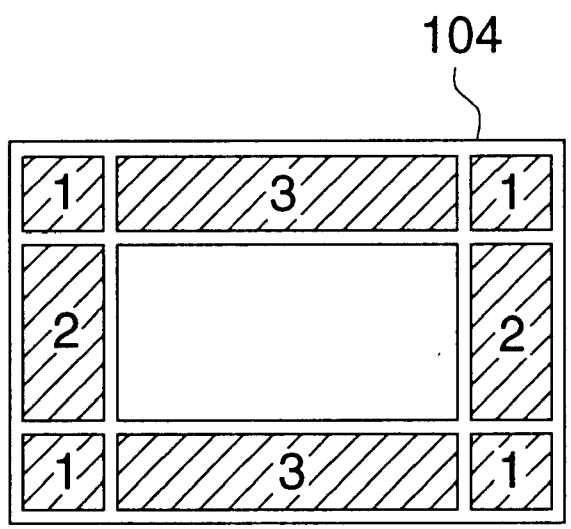
FIG. 7 is a view showing an example of a modification of the display means showing the picture-taking image frame.

FIG. 7 is a view showing another example of modifications of the display means showing the picture-taking image frames. Such the display means is formed of an LCD panel 104, and for example, arranged on the front surface of the mirror M in FIG. 6. In the periphery of the LCD panel 104, discoloring ranges 1 to 3 which can be selectively blackened (or whitened) corresponding to the picture-taking image frames set on the camera side, according to the supply of the power, are provided.

When the Hi-Vision size is selected, all of discoloring ranges 1 to 3 shown in FIG. 7 are not blackened, and thereby, the whole mirror M similar to the Hi-Vision size can be visually confirmed. In contrast to this, when the conventional size is selected, the discoloring ranges 1 and 2 shown in FIG. 7 are blackened, thereby, only the range of the mirror M similar to the conventional size is visually confirmed. Further, when the panorama size is selected, the discoloring ranges 1 and 3 shown in FIG. 7 are blackened, thereby, only the range of the mirror M similar to the panorama size is visually confirmed. Incidentally, when the LCD panel 104 is attached onto the mirror cover 102, the LCD panel 104 is also rotated, and in this case, by attaching the driving circuit of the LCD panel 104 through a flexible substrate (not shown), a rotatable structure can be provided. As described above, according to the structures in FIGS. 6 and 7, corresponding to the picture-taking image frame set on the camera side, an effective reflection range of the mirror is displayed, thereby, the photographer can be judged whether the photographer oneself is in the set picture-taking image frame.

Figure 8:
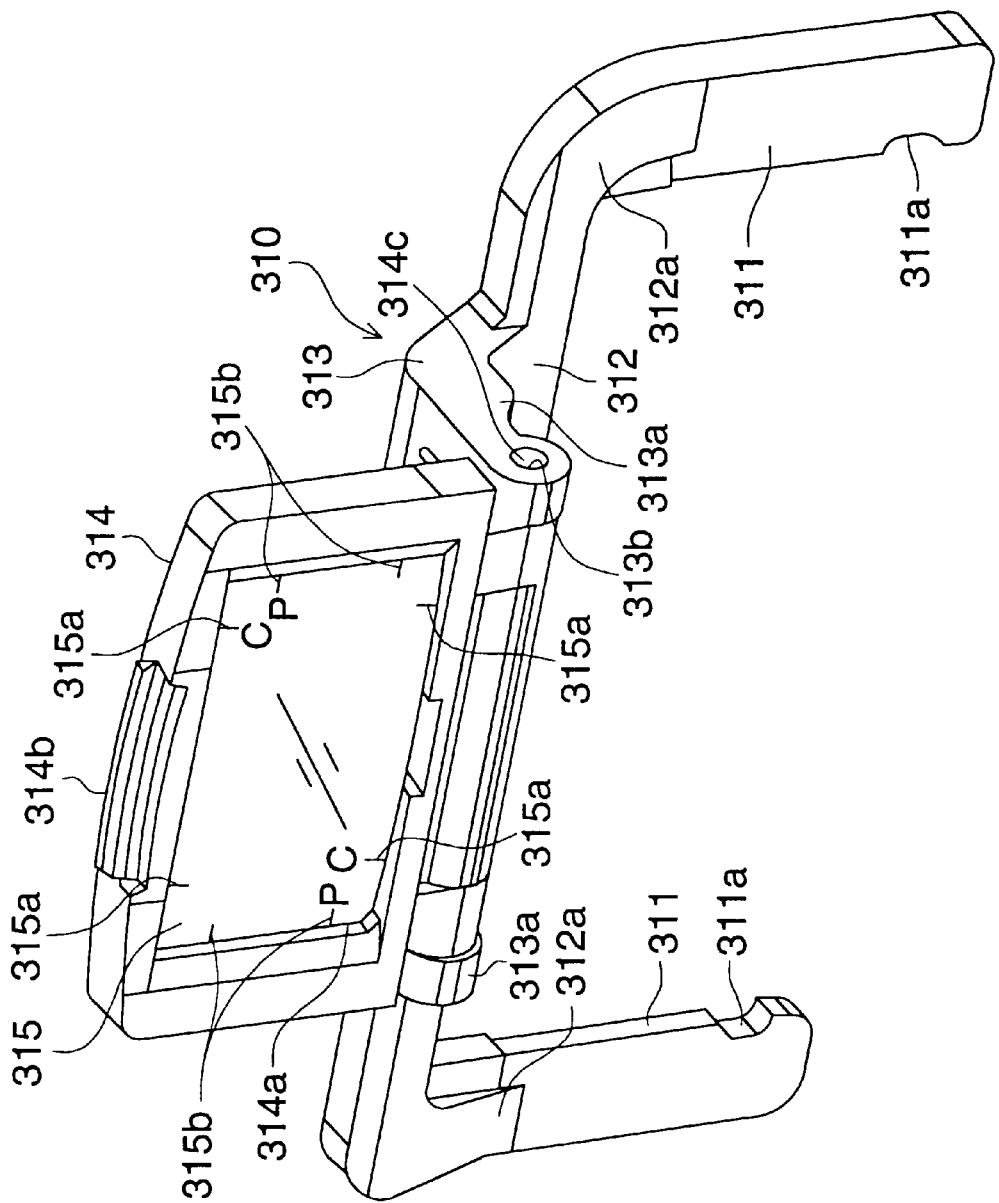
FIG. 8 is a perspective view of a mirror unit shown in the condition that the mirror is raised up.
Figure 9:
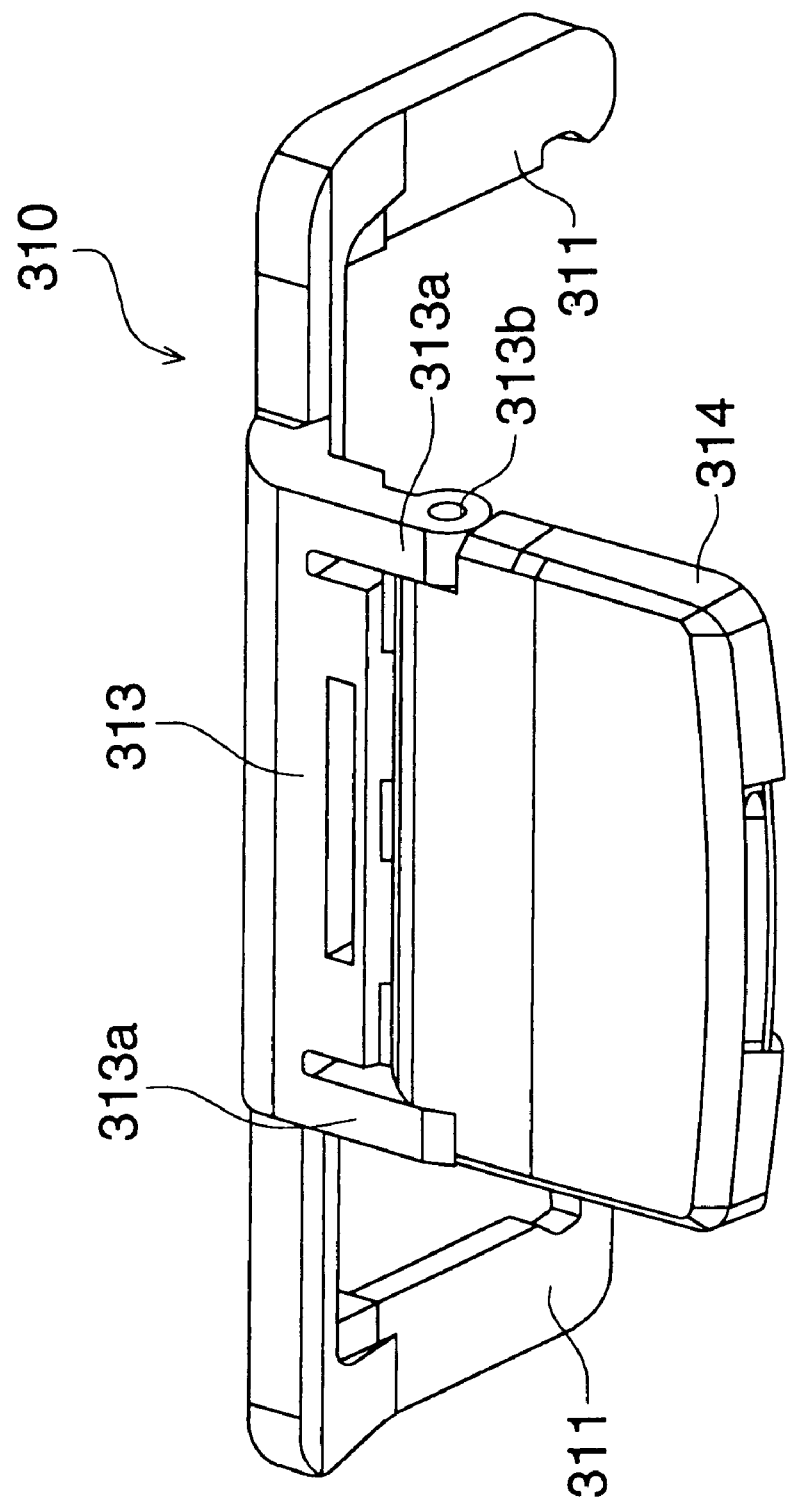
FIG. 9 is a perspective view of the mirror unit shown in the condition that the mirror is turned down.

Further, it can also be considered that the mirror M is another structure separated from the camera. Referring to the drawings, the second embodiment according to another structure will be described below. FIGS. 8 and 9 are views showing a mirror unit according to the present embodiment, and FIG. 8 is a view showing the condition that the mirror is raised up, and FIG. 9 is a view showing the condition that the mirror is brought down. Referring to each view, the mirror unit will be described below.

In FIG. 8, the mirror unit 310 is structured by: a pair of vertically extending leg portions 311; a connection portion 312 connecting the upper end portions of the leg portions 311 to each other; a supporting portion 313 extending from the connection portion 312 to forward; a frame portion 314 supported by the supporting portion 313; and a mirror 315 which is a convex mirror fitted in the frame portion 314. The curvature of the mirror 315 is set such that the range of the mirror 315 coincides with the picture-taking image frame of the camera to which the mirror unit 310 is attached.

In the vicinity of the lower ends of the leg portions 311, concave portions 311a which are opposed to each other, are formed. A cemented portion 312a of the connection portion 312 and leg portion 311 has a smoothly curved surface along the upper end of the rear surface of the camera to which the mirror unit 310 is attached. The supporting portion 313 has a pair of supporting arms 313a extending forward as shown in FIG. 9, and on the front end of each supporting arm 313a, an opening 313b whose axial line is horizontally extending, is provided.

The frame portion 314 has a pair of axes 314c which are opposed to each other and horizontally extending, on the lower end. When the axis 314 is engaged with the opening 313b, the frame portion 314 is attached to the supporting portion 313 so as to be rotatable (tiltable). When a click mechanism (not shown) to restrict the rotation of the frame portion 314 and the supporting member 313 is provided, the frame portion 314 and the supporting member 313 can be held in each of conditions shown in FIGS. 8 and 9, and there is no possibility that, for example, these are carelessly tilted by the self weight. The frame portion 314 has a shallow rectangular recessed portion 314a in the front side in the condition shown by FIG. 8, and has a protrusion 314b which is long sideways, on the upper end. The mirror 315 which is fitted in the recessed portion 314a of the frame portion 314, has the vertical length shorter than the horizontal length, and has the shape similar to a photographic size of so-called Hi-Vision size.

Four indexes 315a and 315b are provided by cutting or printing on the mirror 315. A rectangular frame formed by connecting opposed indexes 315a to each other, is the shape similar to the photographic size of so-called conventional size. On the one hand, a rectangular frame formed by connecting opposed indexes 315b to each other, is the shape similar to the photographic size of so-called panorama size. In order to show to which type of photographic size these indexes 315a and 315b correspond, for example, codes such as "C" showing the conventional size, or "P" showing the panorama size, may be cut or printed addition to indexes close to the indexes.

The mirror unit according to the present embodiment is attached to the mirror, and used for the photographer to judge whether the photographer oneself is in the picture-taking image frame, when the photographer photographs photographer oneself. In the present embodiment, when the photographer photographs in the Hi-Vision size, an image reflected on the whole mirror 315 located at the reflection position is exposed on the film. Accordingly, the photographer may operate the release button after confirming that the photographer oneself or the object to be desired to photograph is in the mirror 315. On the other hand, when the conventional size or panorama size is desired, if the photographer may operate the release button after confirming that the object including the photographer oneself is in the rectangle partitioned by the indexes 31a and 315b, the photo on which the corresponding object is taken, can be obtained.

Figure 10:
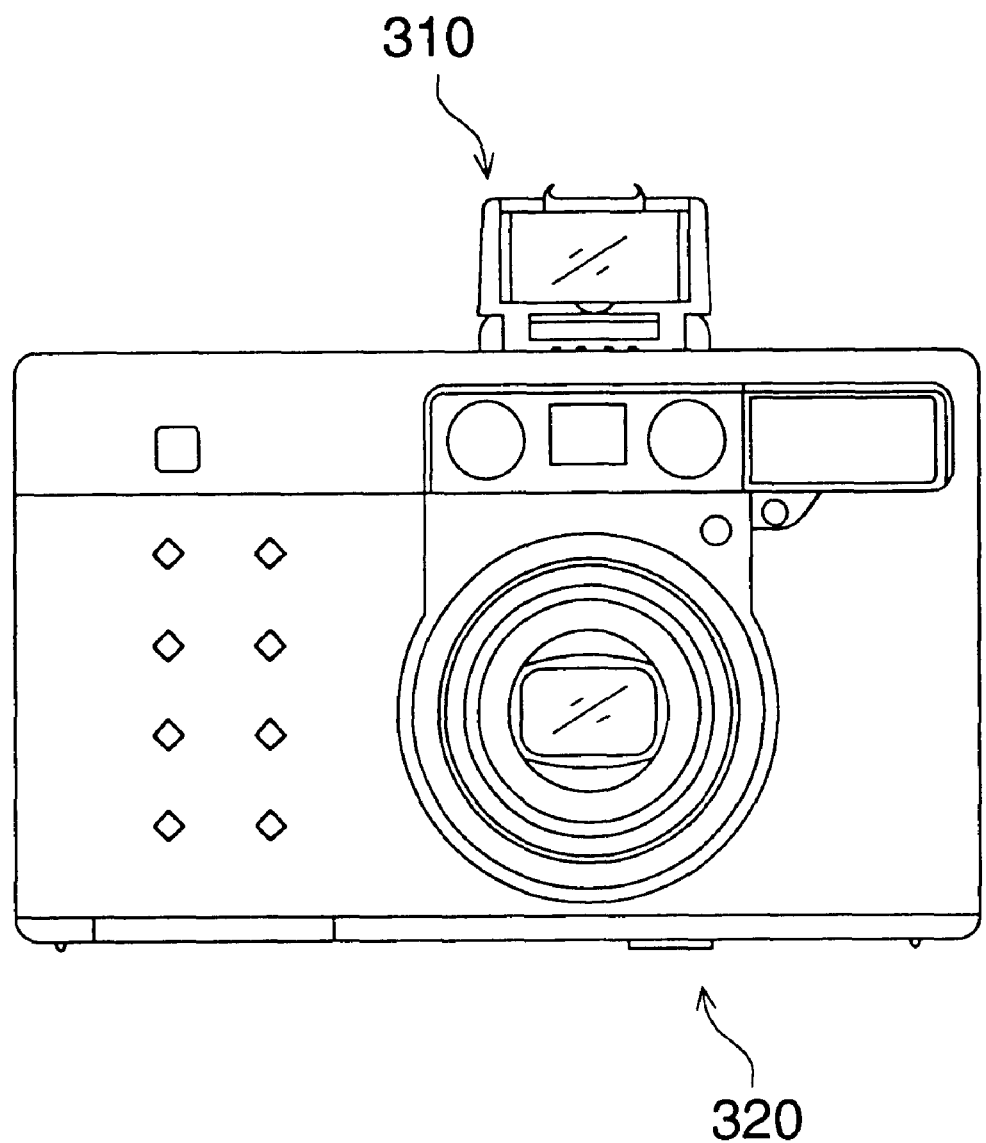
FIG. 10 is a front view shown in a condition in which the mirror unit 310 according to the present embodiment is attached to the camera.
Figure 11:
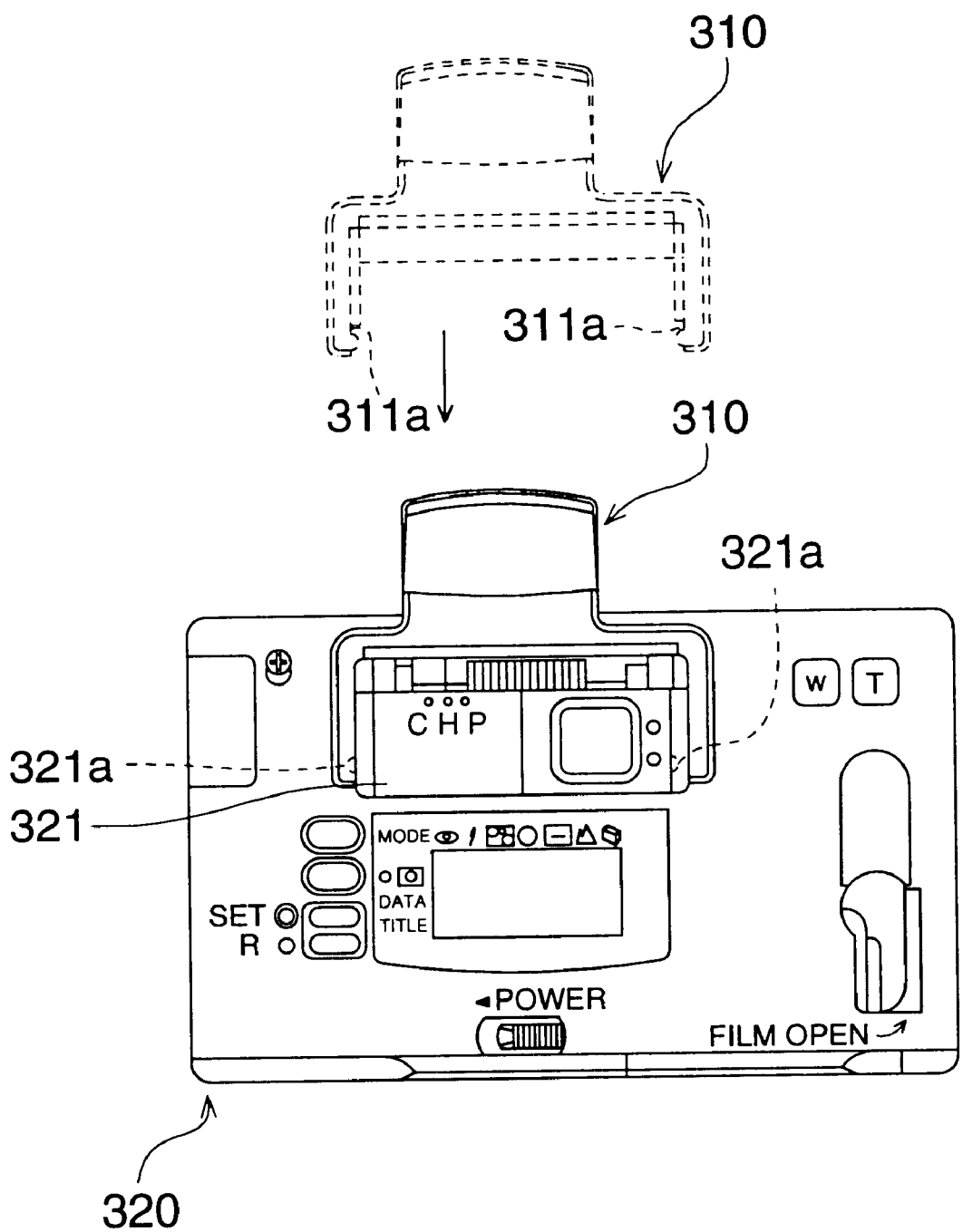
FIG. 11 is a rear view shown in a condition in which the mirror unit 310 according to the present embodiment is attached to the camera.
Figure 12:
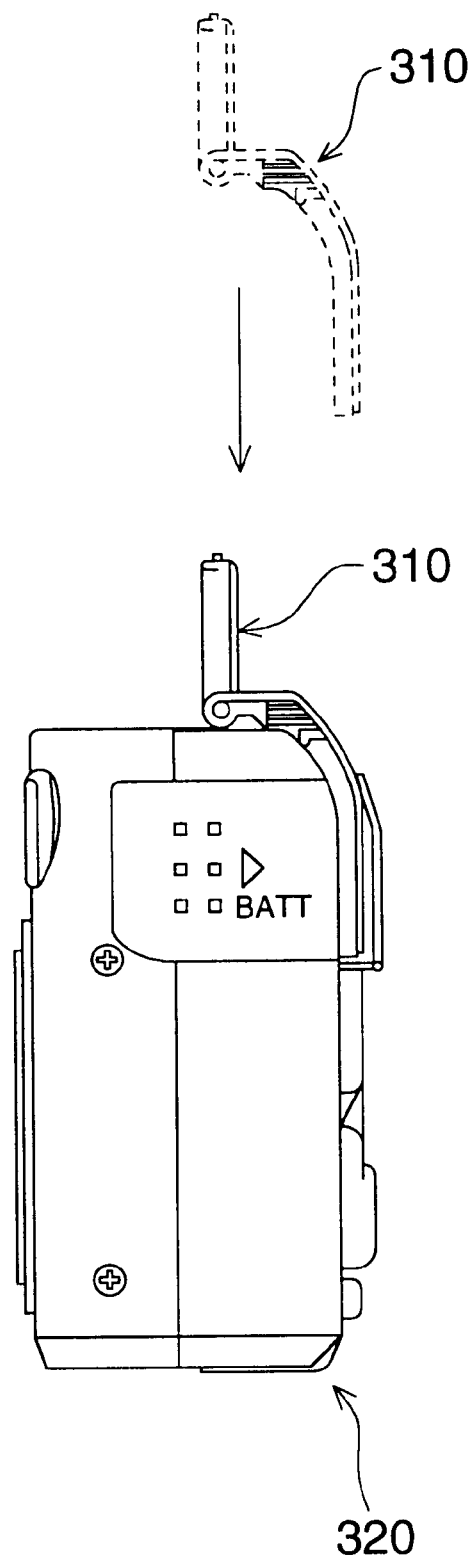
FIG. 12 is a side view shown in a condition in which the mirror unit 310 according to the present embodiment is attached to the camera.
Figure 13:
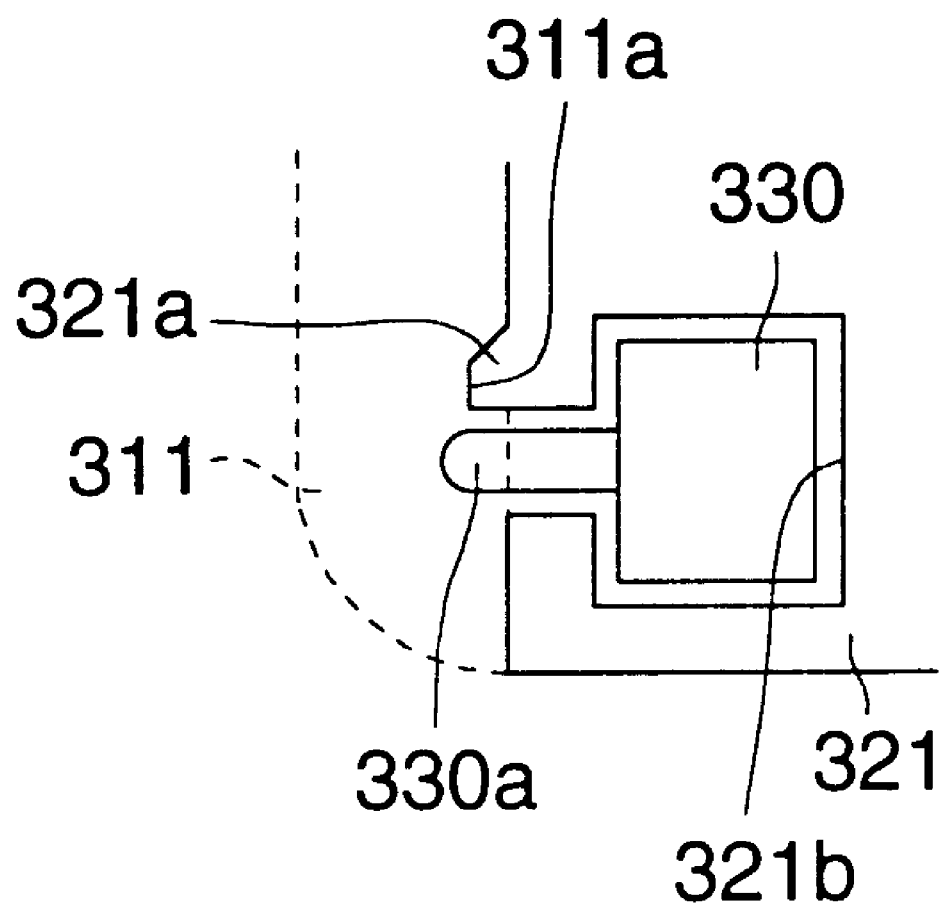
FIG. 13 is a sectional view showing a viewfinder section in FIG. 11 which is enlarged.

FIGS. 10 to 12 are views showing the condition that the mirror unit 310 according to the present embodiment is attached to the camera. FIG. 10 is a front view, FIG. 11 is a rear view, and FIG. 12 is a side view. FIG. 13 is a sectional view showing by enlarging a viewfinder portion in FIG. 11.

As shown in FIG. 11, the mirror unit 310 is attached to the viewfinder portion 321 located on the rear surface of the camera 210. More concretely, the viewfinder portion 321 which is rising rectangular plate-like on the upper portion of the rear surface of the camera 320, forms protrusions 321a on both sides in the vicinity of its lower end. In the condition attached to the reflection position showing in FIGS. 10 to 12, the mirror 315 is arranged at a position where the photographer holding the camera can observe whether the photographer oneself is in the picture-taking image frame so as to photograph oneself. Incidentally, although it is not shown in the drawing, the mirror unit 310 can also tilt to the housing position shown in FIG. 9, in a condition that the mirror unit 310 is attached to the camera 320.

As shown in FIG. 11, the mirror unit 310 is attached from the above, and when the protrusion 321a of the viewfinder portion 321 is engaged with the concave portion 311a of the leg portion 311, the mirror unit 310 is detachably attached to the camera 320 and is not carelessly slipped out. Incidentally, it can also be considered that a protrusion is provided on the leg portion 311, and a concave portion is provided on the viewfinder portion 321.

In FIG. 13, in the vicinity of the lower end of the leg portion 311 (shown by a dotted line) of the mirror unit 310 which is at the attached position, a detection switch 330 is arranged in a recessed portion 321b formed at the viewfinder portion 321. The detection switch 330 has a detection piece 330a which protrudes horizontally. Such the detection piece 330a is at the protrusion position shown in FIG. 13 before the mirror unit 310 is attached, however, when the mirror unit 310 is attached to the viewfinder portion 321, the detection piece 330a is retreated to the detection position recessed from the protrusion position by being pushed out from the leg portion 311 shown by a dotted line. By electrically detecting it, the attachment of the mirror unit 310 can be detected.

According to the present embodiment, before the self portrait mode is set in the camera 320, when the detection switch 330 detects that the photographer attaches the mirror unit 310 to the camera 320, the self portrait mode can also be set corresponding to that. In such the case, the self portrait mode can be released corresponding to the detection of the detachment of the mirror unit 310 by the detection switch 330.

As described above, the present invention is explained referring to the present embodiment, however, the present invention should not be understood by limiting to the above embodiment, but, of course, modifications and improvements can appropriately be conducted. For example, even when the mirror is not used, the photographing in the self portrait mode can be conducted, however, in such that case, it is convenient to be able to annunciate to the photographer holding the camera from the front of the camera whether the self portrait mode is set. As such the annunciation means, when the self portrait mode is set, it is considered that, for example, a light emitting means such as the red-eye reduction lamp or the self timer lamp is made to flicker at the different period from their original flickering period. Further, an exclusively used display by which the set mode can be confirmed from the front of the camera, may be provided.

According to the camera having the more preferable structure of the present invention, it is a camera by which the self portrait photographic mode in which the photographic conditions appropriate to photograph the photographer oneself holding the camera are set, can be set, and when the self portrait photographic mode is set, because the camera photographs without conducting at least one of the distance measurement and the photometry, for example, by fixing the focus position or the aperture value of the photographic lens to a predetermined value, the camera can appropriately photographs the image of the photographer oneself holding the camera. On the one hand, when the normal photographing is conducted, by releasing the self portrait photographic mode, for example, the focus position or the aperture value of the photographic lens can be made to values appropriate for photographing the normal object, by conducting the distance measurement or the photography.

According to the camera having the more preferable structure (2) or (5), for example, when the zoom lens position of the photographic lens is fixed to the wide side, the camera can appropriately photographs the image of the photographer oneself holding the camera. On the one hand, when the normal photographing is conducted, by releasing the self portrait photographic mode, the zoom lens can be moved to a zoom position intended by the photographer, thereby, the camera becomes appropriate for photographing the normal object.

According to the camera having the more preferable structure (8), for example, as the predetermined photographic conditions, by fixing the focus position or the aperture value of the photographic lens, the camera can appropriately photographs the image of the photographer oneself holding the camera. On the one hand, when the normal photographing is conducted, by releasing the self portrait photographic mode, for example, the result of the distance measurement or the result of the photometry can be effective, thereby, the focus position or the aperture value of the photographic lens can be made to values appropriate for photographing the normal object.

According to the camera having the more preferable structure (21), when the self portrait photographic mode is set, even if the mirror member is not driven by the photographer oneself, because the driving means moves the mirror member so that the photographer oneself holding the camera can visually confirm the image of the photographer oneself reflected by the mirror member, the photographer can judge whether the photographer oneself is in the picture-taking image frame, while holding the camera, thereby, a user-friendly camera which is more excellent for operability, can be provided.

Further, when, according to the intention of the photographer, the mirror member is moved from the non-reflection position to the reflection position, it can be considered that the photographer is going to photograph the photographer oneself approaching to the camera. Thus, according to the camera of the present invention, since the self portrait photographic mode is set as the mirror member is displaced to the visibly confirming condition, even if the photographer oneself does not set the self portrait photographic mode, the photographic mode can be set according to the intention of the photographer, thereby a user-friendly camera which is more excellent for operability, can be provided.

Furthermore, when the mirror member is moved from non-reflection position to the reflection position according to the intention of the photographer, it can be considered that the photographer is going to photograph the photographer oneself approaching to the camera. Thus, according to the camera having the more preferable structure (26), even if the photographer oneself does not turn on the power source switch, because the power source switch is turned on according to the intention of the photographer, thereby, a user-friendly camera which is more excellent for operability, can be provided.

In addition to that, it is considered that the mirror member is made to be detachable, and the portability of the camera is more increased. In this case, according to the intention of the photographer, when the mirror member is attached to the reflection position, it can be considered that the photographer is going to photograph the photographer oneself approaching to the camera. Accordingly, according to the camera having the more preferable structure (27), even if the photographer oneself does not set the self portrait photographic mode, because such the photographic mode is set according to the intention of the photographer, thereby, a user-friendly camera which is more excellent for operability, can be provided.

What is claimed is:

1. A camera comprising:
   a photographic lens for photographing an object;
   a mode setting means for selecting a self portrait photographic mode for enabling a photographer to photograph oneself while holding the camera;
   an auxiliary member provided on the camera for enabling the photographer to identify an image of oneself, wherein the auxiliary member is moved so as to face the object in association with setting of the self portrait photographic mode;
   a lens setting means for moving the photographic lens to a predetermined focal point in association with setting of the self portrait photographic mode; and
   a distance measuring means for measuring an object distance, wherein when the self portrait photographic mode is set, the photographic lens is set to the predetermined focal point, and operation of the distance measuring means is inhibited.

2. The camera of claim 1, wherein the predetermined focal point is positioned such that an object located at a distance ranging from about 0.5 meters to about 0.6 meters is focused.

3. A camera comprising:
   a photographic lens for photographing an object;
   a mode setting means for selecting a self portrait photographic mode for enabling a photographer to photograph oneself while holding the camera;
   an auxiliary member provided on the camera for enabling the photographer to identify an image of oneself, wherein the auxiliary member is moved so as to face the object in association with setting of the self portrait photographic mode;
   a photometry means for measuring an object brightness, wherein the photographic lens is set to a predetermined focal point, measurement by the photometry means is inhibited, and an electronic flash is operated in association with setting of the self portrait photographic mode; and
   a distance measuring means for measuring an object distance, wherein when the self portrait photographic mode is set, the photographic lens is set to the predetermined focal point, and operation of the distance measuring means is inhibited.

4. The camera of claim 3, wherein the predetermined focal point is positioned such that an object located at a distance ranging from about 0.5 meters to about 0.6 meters is focused.

5. A zoom camera comprising:
   a photographic zoom lens for photographing an object;
   a mode setting means for selecting a self portrait photographic mode for enabling a photographer to photograph oneself while holding the camera;
   an auxiliary member provided on the camera for enabling the photographer to identify an image of oneself, wherein the auxiliary member is moved so as to face the object in association with setting of the self portrait photographic mode;
   a zooming means for adjusting the photographic zoom lens, wherein the zooming means fixes the photographic zoom lens at a wide angle end position in association with setting of the self portrait photographic mode; and
   a distance measuring means for measuring an object distance, wherein when the self portrait photographic mode is set, the photographic lens is set to the predetermined focal point, and operation of the distance measuring means is inhibited.

6. The zoom camera of claim 5, wherein the predetermined focal point is positioned such that an object located at a distance ranging from about 0.5 meters to about 0.6 meters is focused.

7. A camera comprising:

a photographic lens for photographing an object;

a mode setting means for selecting a self portrait photographic mode for enabling a photographer to photograph oneself while holding the camera;

an auxiliary member provided on the camera for enabling the photographer to identify an image of oneself by facing the object, and the auxiliary member moving between a first state at which the photographer can identify the image of oneself and a second state at which the photographer cannot identify the image of oneself, wherein the self portrait photographic mode is set in association with movement of the auxiliary member from the second state to the first state;

a lens setting means for moving the photographic lens to a predetermined focal point in association with setting of the self portrait photographic mode; and a distance measuring means for measuring an object distance, wherein when the self portrait photographic mode is set, the photographic lens is set to the predetermined focal point, and operation of the distance measuring means is inhibited.

8. The camera of claim 7, wherein the predetermined focal point is positioned such that an object located at a distance ranging from about 0.5 meters to about 0.6 meters is focused.

9. A camera comprising:

a photographic lens for photographing an object;

a mode setting means for selecting a self portrait photographic mode for enabling a photographer to photograph oneself while holding the camera;

an auxiliary member provided on the camera for enabling the photographer to identify an image of oneself by facing the object, and the auxiliary member moving between a first state at which the photographer can identify the image of oneself and a second state at which the photographer cannot identify the image of oneself, wherein the self portrait photographic mode is set in association with movement of the auxiliary member from the second state to the first state;

a photometry means for measuring an object brightness, wherein the photographic lens is set to a predetermined focal point, measurement by the photometry means is inhibited, and an electronic flash is operated in association with setting of the self portrait photographic mode; and a distance measuring means for measuring an object distance, wherein when the self portrait photographic mode is set, the photographic lens is set to the predetermined focal point, and operation of the distance measuring means is inhibited.

10. The camera of claim 9, wherein the predetermined focal point is positioned such that an object located at a distance ranging from about 0.5 meters to about 0.6 meters is focused.

11. A zoom camera comprising:

a photographic zoom lens for photographing an object;

a mode setting means for selecting a self portrait photographic mode for enabling a photographer to photograph oneself while holding the camera;

an auxiliary member provided on the camera for enabling the photographer to identify an image of oneself by facing the object, and the auxiliary member moving between a first state at which the photographer can identify the image of oneself and a second state at which the photographer cannot identify the image of oneself, wherein the self portrait photographic mode is set in association with movement of the auxiliary member from the second state to the first state;

a zooming means for adjusting the photographic zoom lens, wherein the zooming means fixes the photographic zoom lens at a wide angle end position in association with setting of the self portrait photographic mode; and a distance measuring means for measuring an object distance, wherein when the self portrait photographic mode is set, the photographic lens is set to the predetermined focal point, and operation of the distance measuring means is inhibited.

12. The zoom camera of claim 11, wherein the predetermined focal point is positioned such that an object located at a distance ranging from about 0.5 meters to about 0.6 meters is focused.

* * * * *